(12) United States Patent
Abehasera

(10) Patent No.: US 11,383,585 B1
(45) Date of Patent: Jul. 12, 2022

(54) SAFELY VENT FOR VEHICLES

(71) Applicant: Bonalogic, LLC, Hallandale Beach, FL (US)

(72) Inventor: Benyamin Abehasera, Hallandale Beach, FL (US)

(73) Assignee: BONALOGIC, LLC, Hallandale Beach, FL (US)

( * ) Notice: Subject to any disclaimer, the term of this patent is extended or adjusted under 35 U.S.C. 154(b) by 0 days.

(21) Appl. No.: 17/549,320

(22) Filed: Dec. 13, 2021

(51) Int. Cl.
  *B60H 1/34* (2006.01)
  *B60H 1/24* (2006.01)
  *B60H 1/00* (2006.01)

(52) U.S. Cl.
  CPC .......... *B60H 1/3421* (2013.01); *B60H 1/247* (2013.01); *B60H 2001/00721* (2013.01)

(58) Field of Classification Search
  CPC .................. B60H 1/247; B60H 1/3421; B60H 2001/00721
  USPC ............................................................ 454/69
  See application file for complete search history.

(56) References Cited

U.S. PATENT DOCUMENTS

| | | | | |
|---|---|---|---|---|
| 1,123,859 A * | 1/1915 | Dennis | .................. | B60H 1/267 160/19 |
| 1,128,235 A * | 2/1915 | Drew | .................. | B61D 27/009 454/95 |
| 1,628,053 A * | 5/1927 | McTighe | ............... | B60H 1/267 454/132 |
| 3,625,132 A * | 12/1971 | Smith | ...................... | B60H 1/26 454/145 |
| 5,683,293 A * | 11/1997 | Mohammed | ............... | B60J 1/20 296/97.11 |
| 5,687,573 A * | 11/1997 | Shih | .................... | B60H 1/00478 62/262 |
| 6,030,285 A * | 2/2000 | Chen | ...................... | B60H 1/248 454/162 |
| 6,224,479 B1 * | 5/2001 | Iino | ............................ | B60J 1/20 454/132 |
| 6,672,954 B2 * | 1/2004 | Shtanko | ...................... | B60J 1/20 454/162 |
| 2011/0151761 A1 * | 6/2011 | Lesle | ...................... | B60H 1/267 454/75 |

* cited by examiner

*Primary Examiner* — Avinash A Savani
*Assistant Examiner* — Dana K Tighe
(74) *Attorney, Agent, or Firm* — Geoffrey Lottenberg; Berger Singerman LLP

(57) ABSTRACT

A safety ventilation device for vehicles or other applications has a housing with one or more openings covered by a hinged flap with the flaps interconnected by a connecting element. A spring is attached to the connecting element or otherwise to the flaps such that in a first position the spring keeps the flaps open and air can pass through the openings. In a second position, upon the application of force to the flaps, such as airflow caused by a moving vehicle, the spring compresses, and the flaps close. The housing of the device includes a protrusion at the top and a channel at the bottom to facilitate an interference fit between a window and a window or door frame.

15 Claims, 5 Drawing Sheets

SAFELY VENT FOR VEHICLES

CROSS REFERENCE TO RELATED APPLICATIONS

N/A

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION OF THE INVENTION

In the following description, for the purposes of explanation, numerous specific details are set forth to provide a thorough understanding of the invention. It will be apparent, however, to one skilled in the art that the invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
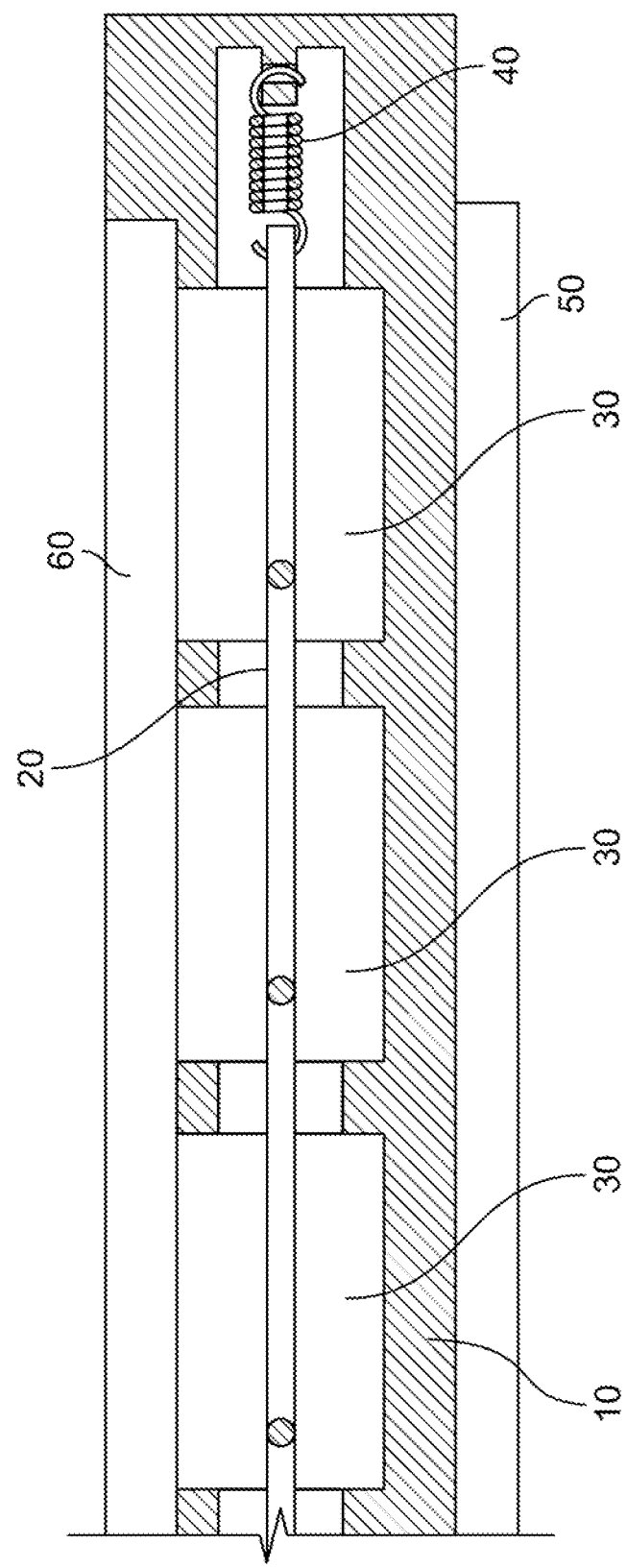
FIG. 1 is an exploded side view of the ventilation device.
Figure 2B:
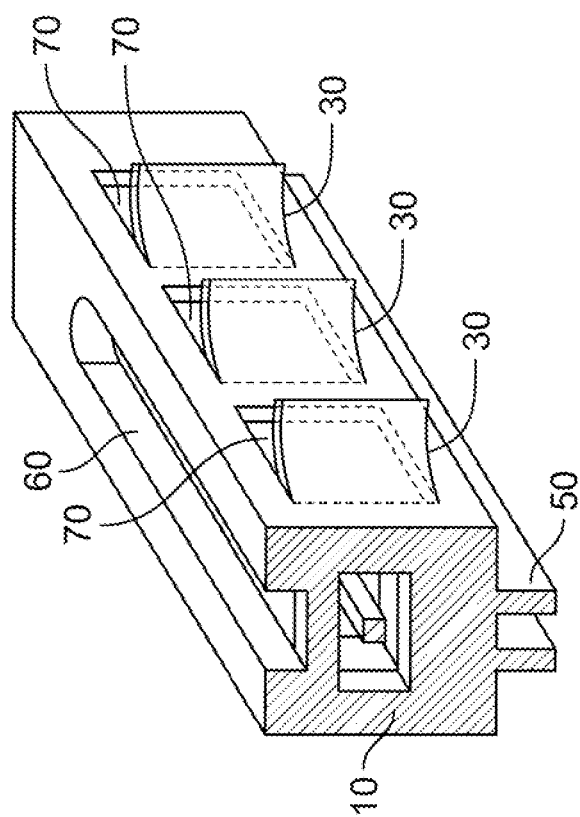
FIG. 2B is a perspective view of the ventilation device with the flaps open.
Figure 2A:
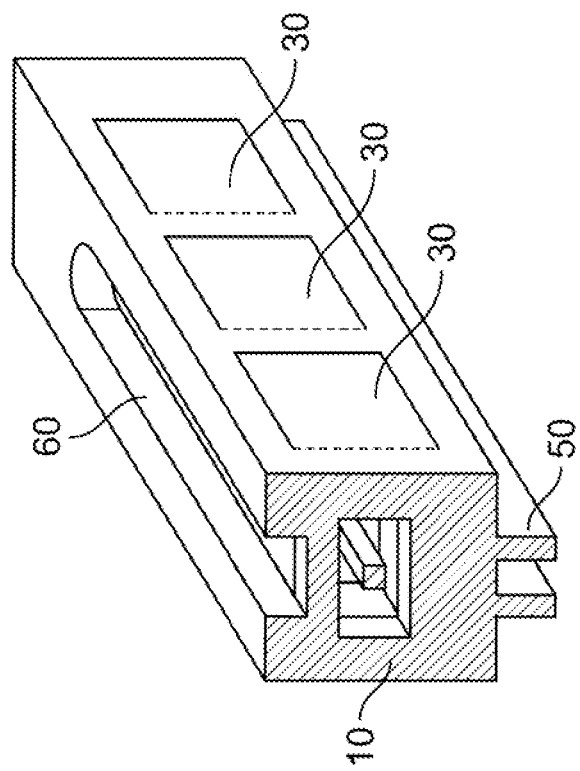
FIG. 2A is a perspective view of the ventilation device with the flaps closed.

Referring to the Figures, shown is a ventilation device comprising a housing 10, one or more connecting elements 20, one or more flaps 30, and one or more springs 40. In some embodiments, the housing is flexible enough to fit and bend between the curvature of a vehicle window and vehicle window channel as to provide for a weather-tight seal. As shown in FIG. 2B, some embodiments have one or more openings 70 along the side of the housing 10 with one or more flaps 30 hingeably connected to the housing 10 near the openings 70. In some embodiments, one or more flaps 30 are hingeably connected in unison to one or more connecting linkages 20' which are connected to the one or more elements 20, with the connecting elements 20 connected to one or more springs 40 located in the housing 10. The connecting elements can either be rigid or flexible. The springs can be any mechanical energy storage device made of metal, rubber, plastic, or a combination thereof. In some embodiments, the flaps 40 are extended outward from the device and towards the posterior of the device. In some embodiments, one or more springs 40 are located in the interior of the housing 10.

When the device is at rest or traveling at low speeds, the spring 40 mechanically presses against the connecting element 20 with force sufficient for the connecting element 20 to mechanically keep the hinged flaps 30 open as to allow for air flow through the openings 70. When sufficient force is applied to the hinged flaps 30, the hinged flaps 30 mechanically push the connecting elements 20 towards the spring 40 with sufficient force to mechanically compress the spring 40, allowing the hinged flaps 30 to close, substantially preventing air flow through the openings 70.

Figure 3:
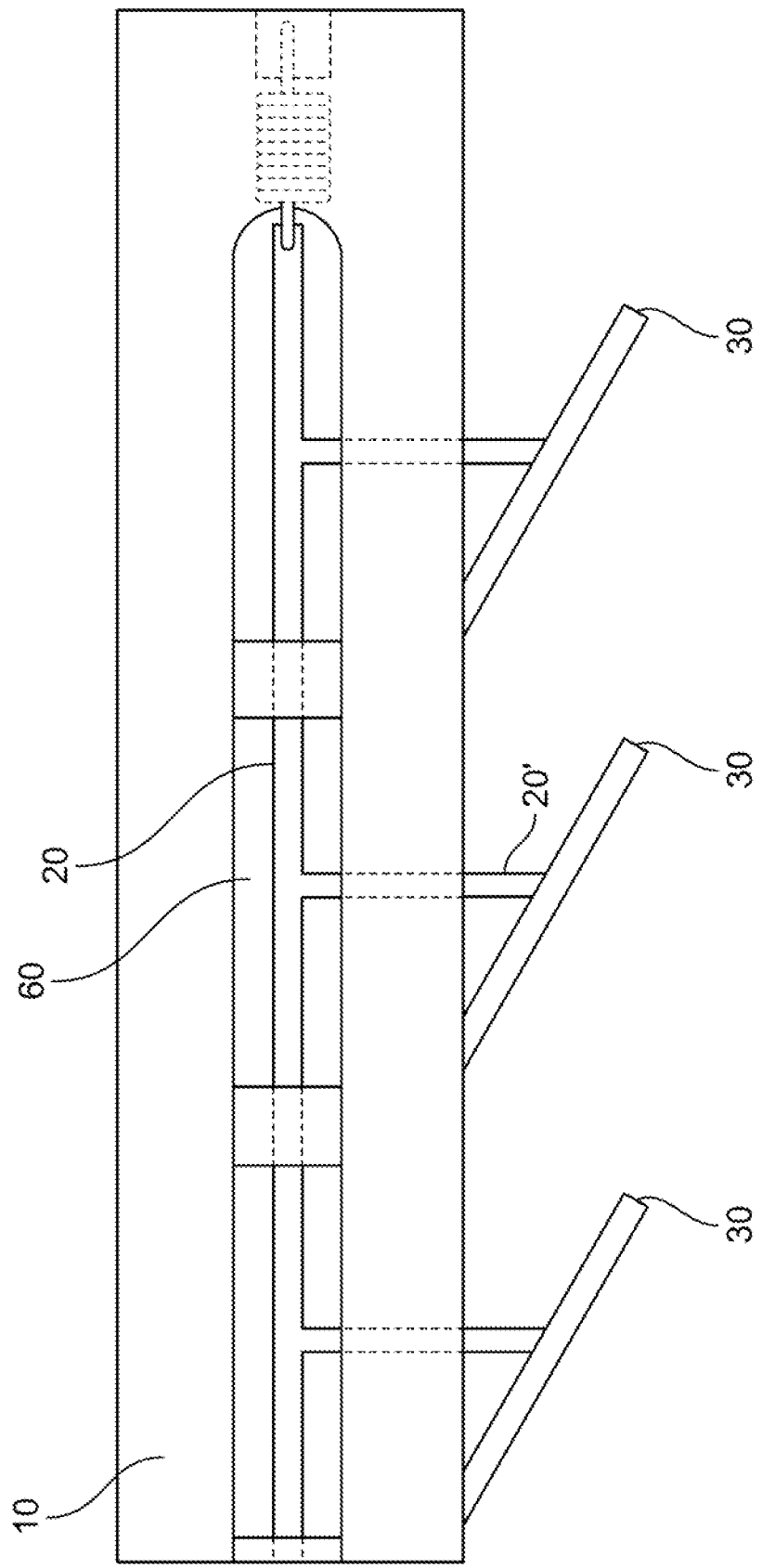
FIG. 3 is a top view of the ventilation device.
Figure 4:
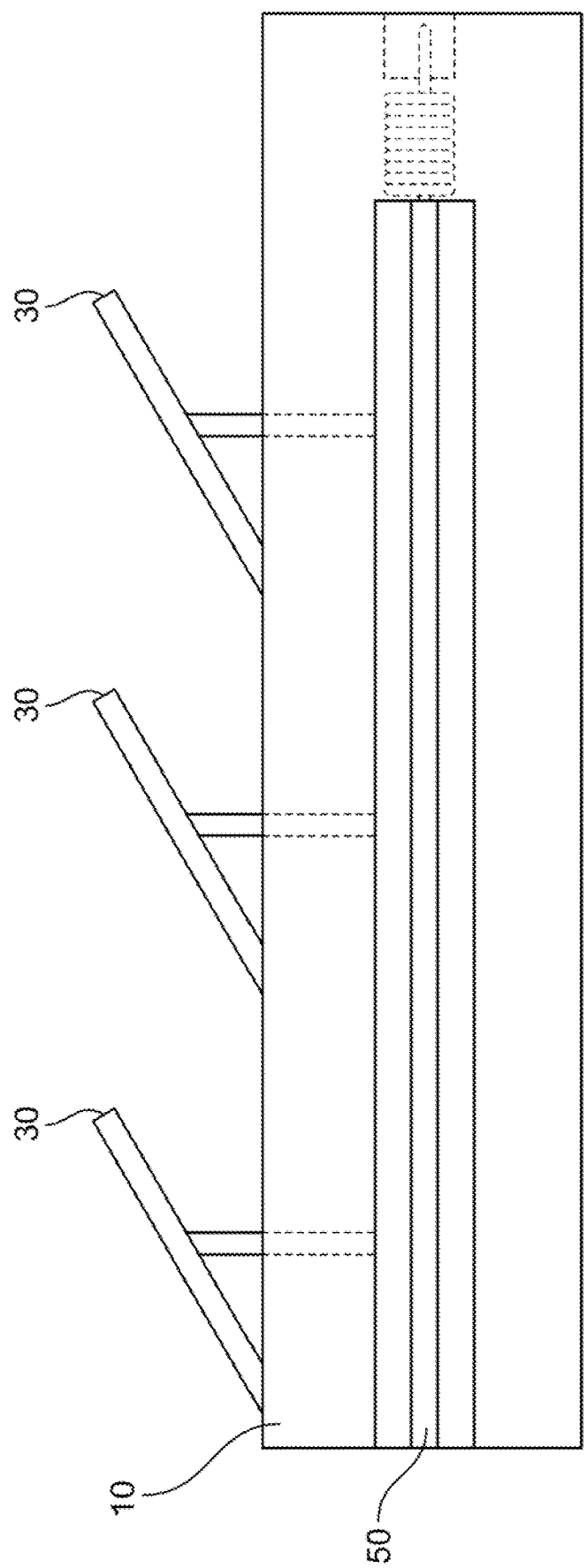
FIG. 4 is a bottom view of the ventilation device

As shown in FIGS. 3-4, in some embodiments, the housing 10 is shaped to provide for an interference fit in between a vehicle window and a vehicle window channel. For example, in some embodiments the bottom of the housing 10 includes a channel 50 along the length thereof, the channel 50 configured to receive the top edge of a vehicle window. In some embodiments the top of the housing 10 includes a protrusion 60 which is configured to fit inside the window frame or door frame, for example at the top of the window opening. In some embodiments, the device could be built into and integral with window or door opening of a vehicle.

In some embodiments, when the device is installed in a vehicle that is still or traveling at less than five (5) miles per hour, the mechanical force of the spring 40 pressing against the connecting element 20 is enough to keep the flaps 30 open at to allow for air flow in the openings 70. In some embodiments, when the device is installed in a vehicle traveling five (5) miles per hour or greater, the force applied by air resistance to the flaps 30 is sufficient to mechanically push the connecting element 20 with enough force to compress the spring 40, allowing the flaps to close as to substantially reduce air flow in the openings 70.

Figure 5:
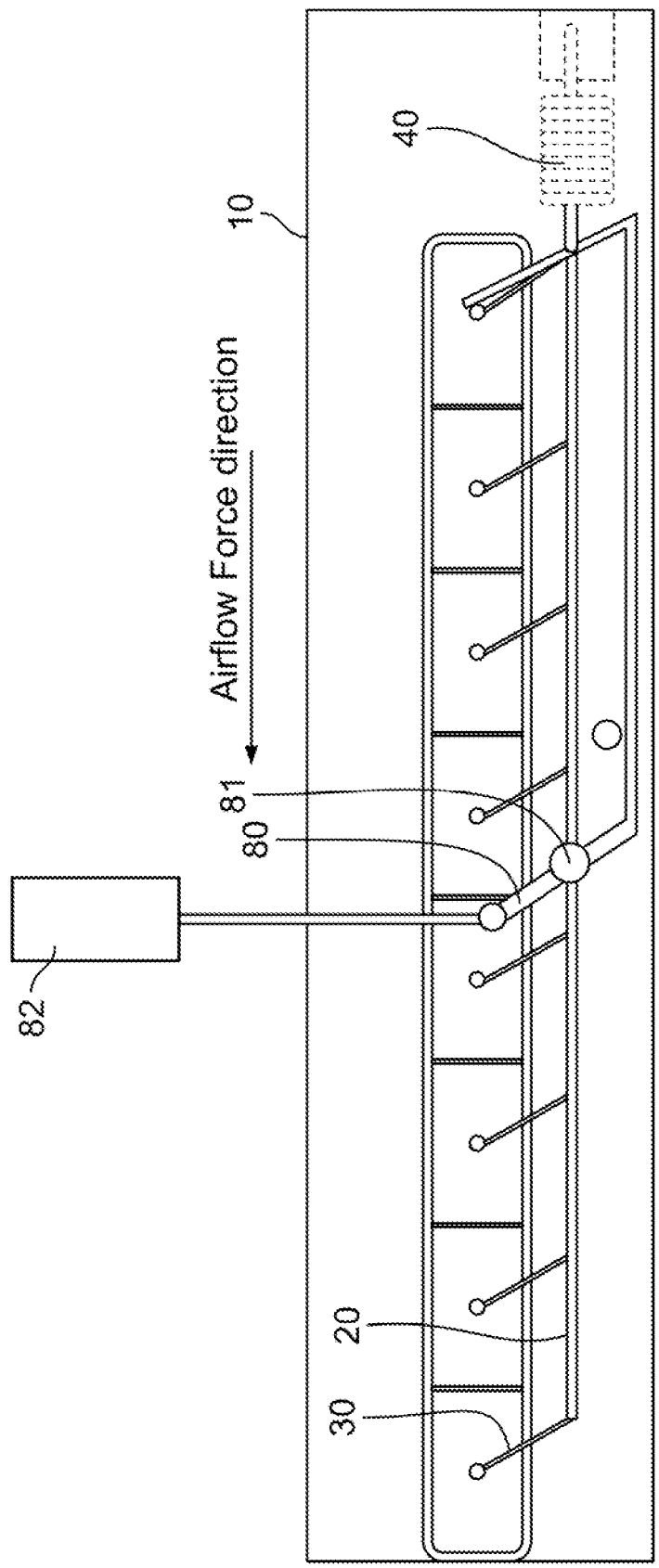
FIG. 5 is top view of another embodiment of the ventilation device.

With reference to FIG. 5, shown is another embodiment of the device shown is a ventilation device comprising a housing 10, one or more connecting elements 20, one or more flaps 30, and one or more springs 40. In some embodiments, one or more flaps 30 are hingeably connected in unison to one or more connecting linkages 20' which are connected to the one or more elements 20, with the connecting elements 20 connected to one or more springs 40 located in the housing 10. The connecting elements can either be rigid or flexible. The springs can be any mechanical energy storage device made of metal, rubber, plastic, or a combination thereof. In some embodiments, the flaps 30 are extended outward from the device and towards the posterior of the device. In some embodiments, one or more springs 40 are located in the interior of the housing 10. In the embodiment shown, an additional spring linkage 80 is provided, which has a pivot point 81 located about the housing 10. The spring linkage 80 is integral with or otherwise connected at one end to the one or more connection elements 20 which are attached to the flaps 30. At the other end of the spring linkage 80 is plate or kite 82 with a prevailing surface area to which force can be applied and that is configured to create drag when in motion. Accordingly, application of force against the plate 82 causes the spring linkage 80 to pivot at pivot point 81, with such force thereby creating an equal-but-opposite force against the spring. In this way, upon application of sufficient force against the plate 82, the spring will compress and the flaps 30 will move. Accordingly, in some embodiments of this configuration, the flaps 30 are oriented to the inside of a vehicle with the plate 82 at the external, exposed to the prevailing wind. When the device is installed in a vehicle that is still or traveling at less than five (5) miles per hour, the mechanical force of the spring 40 pressing against the connecting element 20 is enough to keep the flaps 30 open at to allow for air flow in the openings 70. When the device is installed in a vehicle traveling five (5) miles per hour or greater, the force applied by air resistance to the plate 82 is sufficient to mechanically push the spring linkage 80 with enough force to compress the spring 40, thereby moving connecting element 20 and allowing the flaps 30 to close as to substantially reduce air flow in the openings 70.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A ventilation device comprising:
   a housing with one or more openings;
   each of the one or more openings having a corresponding flap, each corresponding flap hingeably engaged each of the one or more openings; and
   one or more connecting elements attached to each corresponding flap and at least one spring engaged with the one or more connecting elements,
   wherein in a first position, at least one spring retains each corresponding flap in an open position, extended away from the housing, to facilitate air flow through each of the one or more openings; and
   wherein in a second position, when the device is in motion, force is applied to each corresponding flap via air resistance such that the at least one spring compresses and each corresponding flap closes to substantially reduce air flow through each of the one or more openings.

2. The device of claim 1, wherein in the first position each corresponding flap extends away from the device.

3. The device of claim 1, wherein a top of the housing includes a protrusion configured to fit inside a frame of a door or window.

4. The device of claim 1, wherein a bottom of the housing includes a channel configured to receive a top edge of a window.

5. The device of claim 1, wherein the device is installed into a window or door frame by an interference fit.

6. The device of claim 1, including a spring linkage having a first end attached to at least one spring and a second end including a plate, the plate configured to react to force applied thereto in order to compress the spring.

7. The device of claim 1, wherein when the device is installed in a vehicle traveling five (5) miles per hour or greater, the force applied by air resistance to each corresponding flap is sufficient to mechanically push the one or more connecting elements with enough force to compress the at least one or more springs, allowing the each of the corresponding flaps to close as to substantially reduce airflow in each of the one or more openings.

8. A ventilation device comprising:
   a housing with one or more openings;
   each opening having a corresponding flap, each corresponding flap hingeably engaged with each of the one or more openings;
   one or more connecting elements attached to the flaps and at least one spring engaged with the one or more connecting elements;
   wherein in a first position, at least one spring retains each corresponding flap in an open position, extended away from the housing, to facilitate air flow through each the one or more openings; and
   wherein in a second position, when the device is in motion, sufficient force is applied to each corresponding flap via air resistance such that the at least one spring compresses and each corresponding flap closes to substantially reduce air flow through each of the one or more openings.

9. The device of claim 8, wherein a top of the housing includes a protrusion configured to fit inside a frame of a door or window.

10. The device of claim 8, wherein a bottom of the housing includes a channel configured to receive a top edge of a window.

11. The device of claim 8, wherein the device is installed into a window or door frame by an interference fit.

12. The device of claim 8, including a spring linkage having a first end attached to at least one spring and a second end including a plate, the plate configured to react to force applied thereto in order to compress at least one spring.

13. The device of claim 8, wherein when the device is installed in a vehicle traveling five (5) miles per hour or greater, the force applied by air resistance to each corresponding flap is sufficient to mechanically push the one or more connecting elements with enough force to compress the at least one or more springs, allowing the each of the corresponding flaps to close as to substantially reduce airflow in each of the one or more openings.

14. A ventilation device comprising:
   a housing with one or more openings;
   each opening having a corresponding flap, each corresponding flap hingeably engaged with each the one or more openings;
   one or more connecting elements attached to each corresponding flap and at least one spring engaged with the one or more connecting elements;
   wherein a top of the housing includes a protrusion configured to fit inside a frame of a door or window;
   wherein a bottom of the housing includes a channel configured to receive a top edge of a window;
   wherein the device is installed into the window or door frame by an interference fit;
   wherein in a first position, the at least one spring retains each corresponding flap in an open position, extended away from the housing, to facilitate air flow through each the one or more openings; and
   wherein in a second position, when the device is in motion, sufficient force is applied to each corresponding flap via air resistance such that the at least one spring compresses and each corresponding flap close to substantially reduce air flow through each of the one or more openings.

15. The device of claim 14, wherein when the device is installed in a vehicle traveling five (5) miles per hour or greater, the force applied by air resistance to each corresponding flap is sufficient to mechanically push the one or more connecting elements with enough force to compress the at least one or more springs, allowing the each of the corresponding flaps to close as to substantially reduce airflow in each of the one or more opening.

* * * * *